United States Patent
Belser et al.

(10) Patent No.: US 9,373,091 B1
(45) Date of Patent: Jun. 21, 2016

(54) METHOD AND SYSTEM OF PROVIDING VENDING SERVICE

(75) Inventors: John E. Belser, Olathe, KS (US); David U. McKinney, Olathe, KS (US); Timothy L. Swan, Lee's Summit, MO (US); Douglas R. Green, Lenxa, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1416 days.

(21) Appl. No.: 12/054,005

(22) Filed: Mar. 24, 2008

(51) Int. Cl.
*G06F 7/08* (2006.01)
*G06Q 10/00* (2012.01)

(52) U.S. Cl.
CPC ................................ *G06Q 10/00* (2013.01)

(58) Field of Classification Search
USPC ................................ 235/381, 383; 705/26, 27
See application file for complete search history.

(56) References Cited

U.S. PATENT DOCUMENTS

| | | | |
|---|---|---|---|
| 6,473,739 B1 | 10/2002 | Showghi et al. | |
| 6,920,431 B2 | 7/2005 | Showghi et al. | |
| 7,174,308 B2 | 2/2007 | Bergman et al. | |
| 2003/0016122 A1 | 1/2003 | Petrick | |
| 2003/0119558 A1* | 6/2003 | Steadman | H01Q 3/2605 455/562.1 |
| 2004/0143503 A1* | 7/2004 | Suthar | G06Q 50/12 705/15 |
| 2007/0055624 A1* | 3/2007 | Lundvik | G06Q 20/10 705/39 |
| 2007/0088624 A1* | 4/2007 | Vaughn et al. | 705/26 |
| 2009/0094561 A1* | 4/2009 | Do | G06F 3/0425 715/863 |

OTHER PUBLICATIONS

Philips Semiconductors, "NFC Delivers Intuitive, Connected Consumer Experience" (May 1, 2006).
Christian van't Hof and Jessica Cornelissen, "RFID and Identity Management in Everyday Life: Case Studies on the Frontline of Developments Towards Ambient Intelligence" (Oct. 2006).
RFID Talk, "RFID Tracking," http://www.rfidtalk.com/showthread.php?t=566 (posts from Jun.-Aug. 2004, printed on Jun. 26, 2007).
John Cook, "Dialing for a dog and drink from the seats at Safeco Field," http://seattlepi.nwsource.com/baseball/126063_mfood 11.html (Jun. 11, 2003).
Matthew Miller "Stay Seated: Get stadium food without missing a play," http://www.edn.com/article/CA236853.html?text=get+stadium+food+without+missing++play (Jul. 31, 2002).

* cited by examiner

*Primary Examiner* — Michael G Lee
*Assistant Examiner* — Tabitha Chedekel

(57) ABSTRACT

A method and system for providing a user of a wireless communication device (WCD) with vending service. The WCD may present the user with data indicating items available for purchase from a vendor. The WCD may then receive the user's directive to order an item from the vendor. In response, the WCD may obtain data stored at a transponder in proximity to the WCD that indicates a location of the WCD. In one example, the transponder may be at a fixed location, such as by being affixed to a fixed object at a venue (e.g., a stadium seat), in which case the stored data may indicate the fixed location. The WCD may then send an order for the item and the obtained data to the vendor. In turn, the vendor may use the data to determine a location of the WCD and then deliver the item to the determined location.

26 Claims, 7 Drawing Sheets

METHOD AND SYSTEM OF PROVIDING VENDING SERVICE

FIELD OF THE INVENTION

The present invention relates to wireless communication, and more particularly to using wireless communication to provide vending service to an attendee of a venue such as a stadium.

BACKGROUND

At most venues that host large events today, such as stadiums, theatres, convention centers, and/or fairgrounds for instance, vendors offer a wide variety of items for purchase by the attendees of the events. These items may include food, beverages, apparel, and/or souvenirs for instance. Typically, vendors sell these items at stands or shops located throughout the venue, thus requiring attendees of the venue to leave their seats, wait in a line, and/or temporarily turn their focus away from the event in order to purchase the items. Some of these items may also be carried and sold by roaming vendors that move throughout the venue. However, roaming vendors typically only cover a limited area of the venue and/or only carry a limited selection of items for purchase, and as such these roaming vendors may not fully satisfy an attendee's needs. Further, paying these roaming vendors for a purchased item during the event may be awkward, cumbersome, and/or time consuming, especially when the venue is crowded. Accordingly, an improved method and system for providing vending service to attendees of venues that host large events is desirable.

OVERVIEW

In one aspect, the present invention may take the form of a method for providing a user of a wireless communication device (WCD) with vending service. The method may include (a) receiving into the WCD from the user a first directive to order at least one item from the vendor, (b) in response to receiving the directive, obtaining data stored at a transponder in proximity to the WCD, wherein the data indicates a location of the WCD, and (c) sending an order for the at least one item and the obtained data to the vendor, whereby the vendor uses the data to determine a location of the WCD and delivers the at least one item to the determined location.

In one embodiment, the transponder may be a radio-frequency identification (RFID) tag. In another embodiment, the transponder may be at a fixed location, in which case the data stored at the transponder may include data indicating the fixed location. In another embodiment, the transponder may be affixed to a fixed object at a venue. In this respect, the venue may include a plurality of seats, and the transponder may be affixed to a seat being occupied by the user. In yet another embodiment, the transponder may be a closest transponder of a plurality of transponders in proximity to the WCD.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

DETAILED DESCRIPTION

Figure 1:
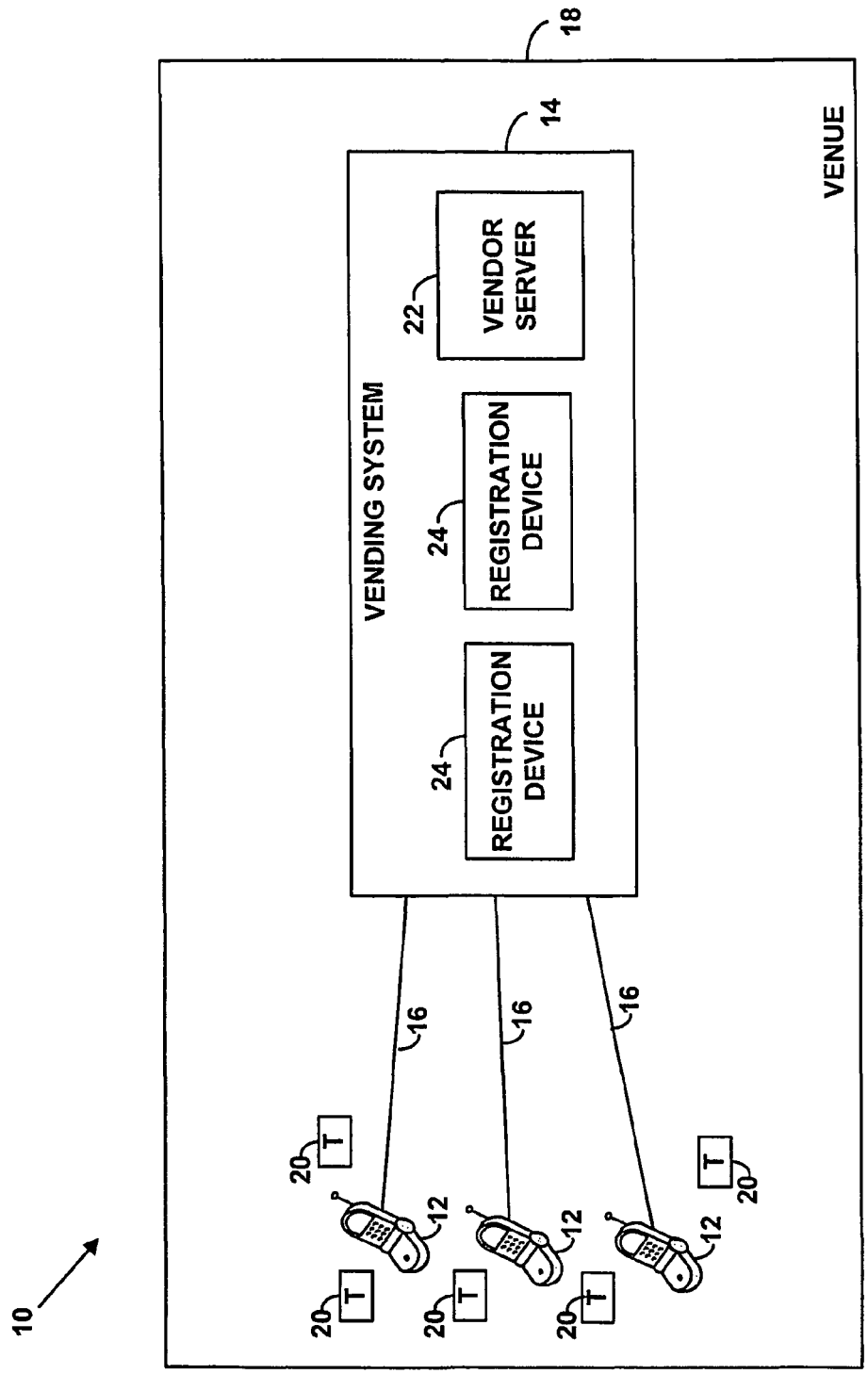
FIG. 1 is a simplified block diagram of a telecommunication system in which an exemplary embodiment of the invention can be implemented.

Referring to the drawings, FIG. 1 is a simplified block diagram of a telecommunications system 10 in which an exemplary embodiment of the invention can be implemented. It should be understood, however, that this and other arrangements described herein are set forth for purposes of example only. As such, those skilled in the art will appreciate that other arrangements and other elements (e.g., machines, interfaces, functions, orders of functions, etc.) can be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic. For instance, various functions may be carried out by a processor executing a set of machine language instructions stored in memory.

As shown, the system 10 may include one or more wireless communication devices (WCDs) 12, each of which are communicatively coupled with a vending system 14 via a respective communication path 16. Further, as shown, the WCDs 12 and at least a portion of the vending system 14 may be located within a venue 18, which may additionally house one or more transponders 20. The system 10 may include other entities as well.

The WCDs 12 may include a variety of wireless handheld devices that are operated by attendees of the venue 18, such as cellular telephones, smartphones, personal digital assistants (PDAs), tablet PCs, personal navigation devices (PNDs), personal media players (PMPs), and/or wirelessly-equipped digital cameras for instance. Additionally, the WCDs 12 may include wireless handheld devices that are operated by roaming vendors, such as handheld devices that are specifically designed to interact with the vending system 14. Other examples are possible as well. Each WCD 12 will preferably include a user interface through which a user may interact with the WCD 12. In this respect, the user interface may include both input components (e.g., a touch screen, a navigation pad, a thumb wheel, a keyboard, a microphone, etc.) and output components (e.g., a display screen and/or a speaker).

The WCDs 12 may communicate according to any of a variety of wireless protocols, including CDMA (e.g., 1×RTT, IS-856), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Near Field Communication (NFC), Bluetooth, Infrared (e.g. IrDA), Wireless USB, ZigBee, EnOcean, Wibree, Z-Wave, Radio-Frequency Identification (RFID) (e.g. ISO/IEC 14443, EPC Gen2), and other protocols now known or later developed. In a preferred example, the WCDs 12 operated by the attendees of the venue 18 will communicate according to at least three wireless protocols: (1) a cellular protocol such as CDMA, iDEN, TDMA, AMPS, GSM, GPRS, UMTS, EDGE, WiMAX, or LTE for instance, (2) a short-range wireless protocol such as NFC, Bluetooth, Wi-Fi, Infrared, Wireless USB, ZigBee, EnOcean, Wibree, or Z-Wave for instance, and (3) an automatic identification and data capture (AIDC) protocol such as RFID, in which case the WCDs 12 will preferably function as RFID readers (also known as RFID interrogators) that are capable of reading data stored at the transponders 20.

The vending system 14 may be owned and operated by a vendor, and may generally function to provide vending service to attendees of the venue 18. In this respect, the vending system 14 may facilitate the ordering and delivery of items available for purchase from the vendor at the venue 18. As shown, the vending system 14 may include at its core an on-site vendor server 22. The on-site vendor server 22 may function to register WCDs 12 (and users thereof) for vendor delivery service, maintain data for the WCDs 12 (and users thereof), receive orders for items from the WCDs 12, and facilitate the fulfillment of those orders. As such, the on-site vendor server 22 may take the form of a "server" class computer, a personal computer, and/or some other programmable computing device arranged to carry out at least the above functions.

The vending system 14 may also include one or more registration devices 24, each of which may be a hardware device that wirelessly communicates with the WCDs 12 to facilitate the registration of the WCDs 12 (and users thereof) with the vending system 14. In this respect, the registration devices 24 may each include a transceiver that facilitates communication with the WCDs 12 according to any of a variety of short-range wireless protocols, including NFC, Bluetooth, Infared (e.g. IrDA), Wireless USB, ZigBee, EnOcean, Wibree, Z-Wave, and other protocols now known or later developed. Additionally, the registration devices 24 may each include a user interface that facilitates direct user interaction with a given registration device 24 during the registration process. In this respect, the user interface may include a variety of input components (e.g., a touch screen, a keyboard, a microphone, etc.) and output components (e.g., a display screen and/or a speaker). In one example, the registration devices 24 may take the form of fixed-location registration kiosks. In another example, the registration devices 24 may take the form of handheld WCDs operated by employees of the vendor and/or the venue 18. Other examples are possible as well.

The vending system 14 may additionally include other entities that are not shown in FIG. 1, such as additional on-site servers, one or more off-site servers, and/or a payment gateway for instance. The entities of the vending system 14 may be communicatively coupled via a variety of different links and/or networks, including links and/or networks in the communication path 16. Further, the entities of the vending system 14 may communicate with one another according to any of a variety of protocols.

Each communication path 16 may function to communicatively couple one of the WCDs 12 with the vending system 14. In this respect, each communication path 16 between a given WCD 12 and the vending system 14 may include one or more wired links, one or more wireless links, one or more networks, and/or one or more network devices (e.g., gateways, switches, routers, and/or wireless access points, etc.). Further, each communication path 16 between a given WCD 12 and the vending system 14 may include multiple communication paths, such as one communication path between the given WCD 12 and each entity of the vending system 14 (e.g., on-site server 22, the registration devices, etc.).

Figure 2:
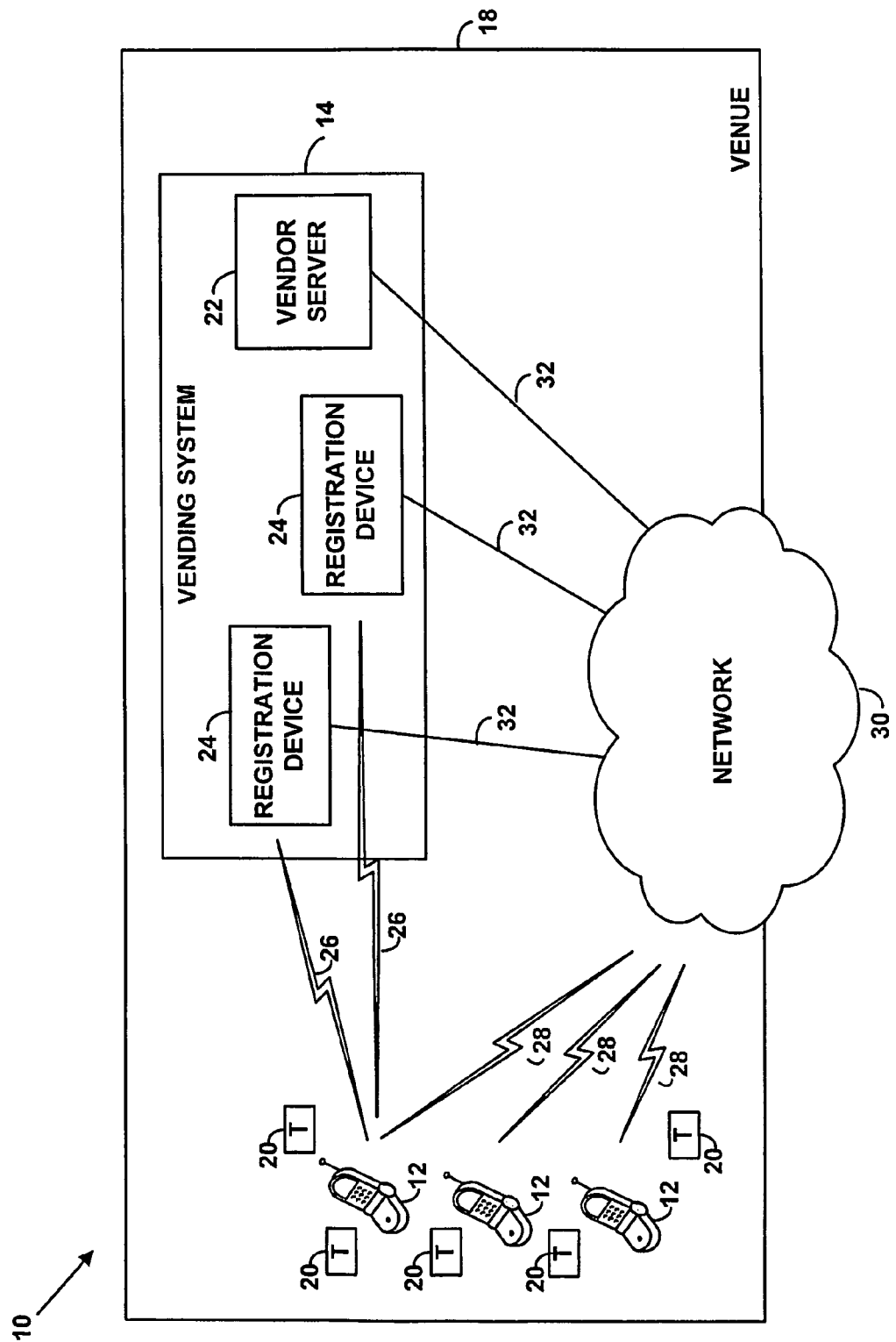
FIG. 2 is a simplified block diagram of the system of FIG. 1 with exemplary communication paths.

FIG. 2 is a simplified block diagram of the system 10 with exemplary communication paths 16. As shown, each exemplary communication path 16 between a given WCD 12 and the vending system 14 may include (a) a wireless link 26 between the given WCD 12 and each registration device 24, and (b) a wireless link 28, a network 30, and a wired link 32 between the given WCD 12 and each entity of the vending system 14. (Although FIG. 2 only depicts wireless links 26 between one WCD 12 and the registration devices 24, it should be understood that wireless links 26 may exist between each WCD 12 and each registration device 24). In this respect, the given WCDs 12 will preferably communicate with the registration devices 24 directly via the wireless links 26, but the given WCDs 12 may also communicate with the registration devices 24 indirectly via the path that includes the wireless link 28, the network 30, and the wired link 32. Each exemplary communication path 16 may include other communication paths as well.

The wireless links 26 may be radio frequency (RF) air interfaces that carry communications directly between the WCDs 12 and the registration devices 24 according to any of a variety of wireless protocols, and preferably short-range wireless protocols. For example, the wireless links 26 may carry communications according to NFC, Bluetooth, Infared (e.g. IrDA), Wireless USB, ZigBee, EnOcean, Wibree, Z-Wave, and other protocols now known or later developed.

Similarly, the wireless links 28 may be RF air interfaces that carry communications between the WCDs 12 and the network 30 according to any of a variety of wireless protocols. For example, the air interfaces may carry communications according to CDMA (e.g., 1×RTT, IS-856), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, and other protocols now known or later developed.

The network 30 may include a variety of different network types, such as one or more radio access networks (RANs), packet-switched networks, circuit-switched networks (e.g., a public switched telephone network (PSTN)), and/or signaling networks (e.g., a Signaling System #7 (SS7) network) for instance. The network 16 may also include network devices, such as gateways, switches, routers, and/or wireless access points for instance. The network 30 may include other elements as well.

The wired links 32 may be take various forms, such as twisted-pair cables, coaxial cables, and/or optical fiber cables for instance. Further, the wired links 32 may carry communications according to any of a variety of protocols. For example, the wired links may carry communications according to Ethernet, Asynchronous Transfer Mode (ATM), Point-to-Point Protocol (PPP), and/or any other protocols now known or later developed.

Figure 3:
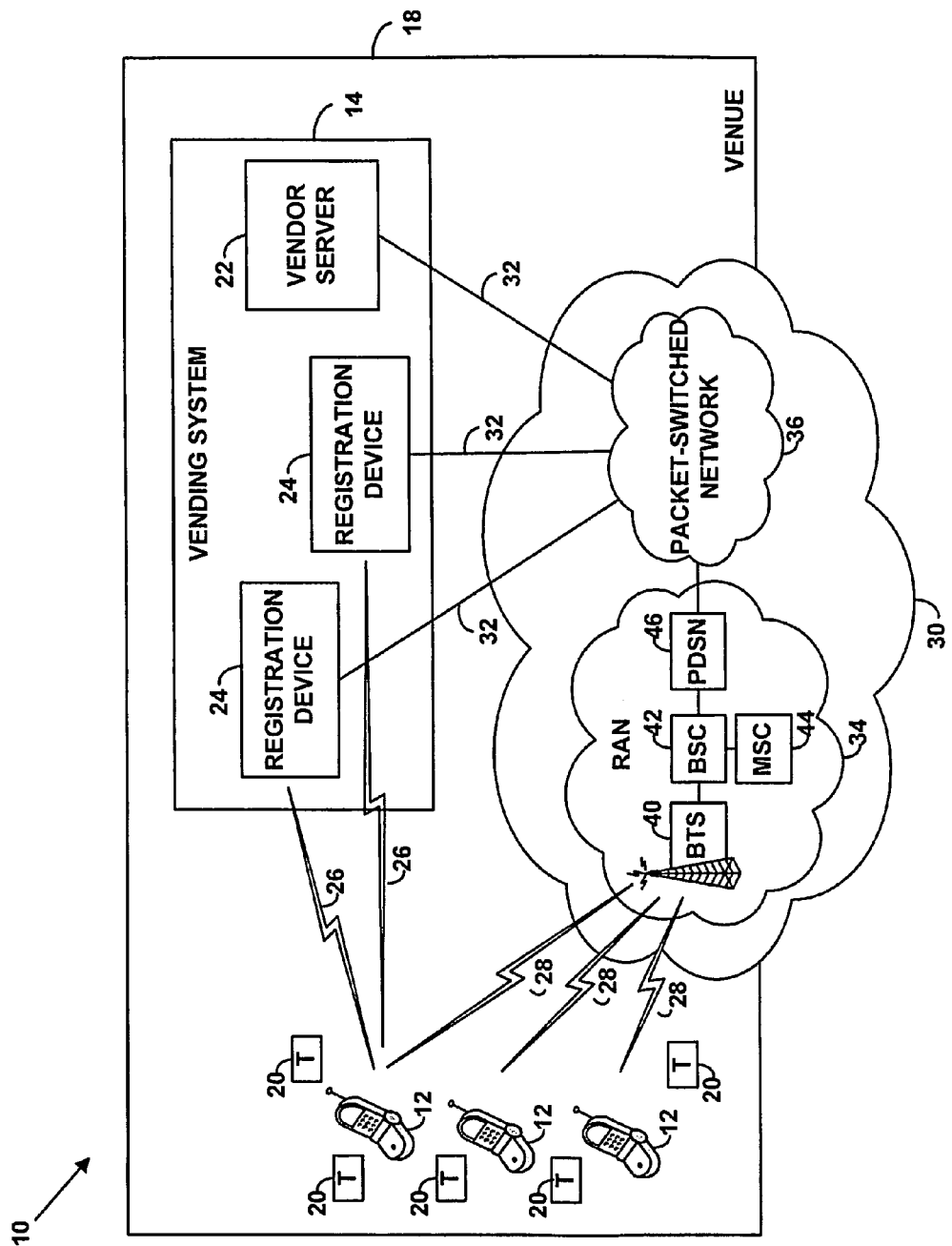
FIG. 3 is a simplified block diagram of the system of FIG. 2 with an exemplary network.

In a preferred example, the network 30 will include at least (a) a RAN that facilitates wireless communication with the WCDs 12 via the wireless links 28, and (b) a packet-switched network that facilitates packet-based communication between the vending system 14 and the RAN, as well as various other entities, devices, and/or networks. As such, FIG. 3 is a simplified block diagram of the system 10 with an exemplary network 30. As shown, the exemplary network 30 may include a RAN 34 and a packet-switched network 36.

The RAN 34 may include, among other entities, a base transceiver station (BTS) 40, a base station controller (BSC) 42, a mobile switching center (MSC) 44, and a packet data serving node (PDSN) 44. The BTS 40 may radiate to define the air interfaces 28 over which the WCDs 12 can communicate with the RAN 34. In this respect, the air interfaces 28 defined by the BTS 40 may also define the RAN's coverage area.

The BTS 40 may then be coupled to or integrated with the BSC 42, which may function to communicate with the BTS 40 and control aspects of the BTS 40 as well as aspects of the wireless communication over the air interfaces 28. In turn, the BSC 42 may be communicatively coupled to one or more transport networks. For example, as shown, the BSC 42 may be communicatively coupled to the MSC 44, which may provide connectivity with a circuit-switched network (not shown). As another example, the BSC 42 may be coupled to the PDSN 46, which may provide connectivity with the packet-switched network 36. Other examples are possible as well.

The packet-switched network 36 may facilitate packet-based communication between and among the entities, devices, and/or networks of the system 10, including the RAN 34 and/or the entities of the vending system 14 (e.g., the on-site vendor server 22 and the registration devices 24). As such, the packet-switched network 36 may include some combination of personal area networks (PANs), local area networks (LANs), metropolitan area networks (MANs), and/or wide area networks (WANs), and will preferably include at least a wireless carrier's core packet network and/or the Internet. The packet-switched network 36 may route packets based on an Internet Protocol (IP) protocol in combination with the Transmission Control Protocol (TCP) and the Hypertext Transfer Protocol (HTTP). Many other examples of network configurations and transmission protocols are possible as well.

The venue 18 may be any location and/or structure that is capable of hosting an event or a gathering. As examples, the venue 18 may be a stadium, a theatre, a conference or convention center, a banquet hall, and/or fairground. Depending on the type of venue 18, the venue 18 may host a variety of different events, including sporting events, concerts, movie-showings, conferences, festivals, and/or ceremonies for instance. During an event at the venue 18, the vendor may offer a wide variety of items for purchase by attendees of the events, such as food, beverages, apparel, and/or souvenirs for instance. These items may be located at various places throughout the venue 18, including stands and/or stores that offer the items for sale, trays carried by roaming vendors, and/or predefined storage locations (e.g., inventory). As such, attendees may purchase these items by visiting the stands and/or stores or flagging down a roaming vendor. Alternatively, the attendees may purchase the items using the vending service described herein.

The transponders 20 may function to wirelessly transmit pre-stored identification data to a reader device within range of the transponder 20 (e.g., a WCD 12 functioning as an RFID reader). The transponders 20 will preferably only transmit the pre-stored identification data in response to receiving a control signal from a reader device within range of the transponder 20 (e.g., a WCD 12 functioning as an RFID reader). The transponders 20 may include (a) an integrated circuit for storing and/or processing data and (b) an antenna that facilitates wireless communication according an AIDC protocol such as RFID (e.g., ISO/IEC 14443, EPC Gen2, etc.) or another AIDC protocol now known or later developed. The range and/or security of the transponders 20 may vary depending on the implementation.

In one aspect, the transponders 20 may take the form of RFID tags. For example, the RFID tags may be passive RFID tags, which are RFID tags that do not have an internal power supply and instead draw power from control signals received from reader devices within range of the RFID tags. In this respect, the passive RFID tags may transmit the pre-stored identification data to a reader device by reflecting a received control signal via passive backscatter and/or inductive coupling. Typically, passive RFID tags have a smaller read range (e.g., 10 cm to a few meters), smaller storage capacity, and no processing capability. As another example, the RFID tags may be semi-passive RFID tags, which are RFID tags that have an internal power supply but still need to draw power from received control signals. In this respect, similar to passive RFID tags, the semi-passive RFID tags may transmit the pre-stored identification data to a reader device by reflecting a received control signal via passive backscatter and/or inductive coupling. Typically, semi-passive RFID tags have a larger read range (e.g., tens of meters), larger storage capacity, processing capability, and increased sensitivity to control signals. As yet another example, the RFID tags may be active RFID tags, which are RFID tags that have an internal power supply and do not need to draw power from received control signals. In this respect, the active RFID tags may transmit the pre-stored identification data to a reader device via an internally powered transmitter. Typically, active RFID tags have much larger read ranges (e.g., hundreds of meters), much larger storage capacity, processing capability, and increased sensitivity to control signals. There is typically minimal security during communication with RFID tags.

In another example, the transponders 20 may take the form of contactless smart card technology. Contactless smart card technology may provide increased security and storage capabilities over RFID tags, but may have a very small read range (e.g., 10 cm or less). Further, similar to passive RFID tags, contactless smart card technology typically does not require an internal power supply. Other examples of transponders 20 may exist as well.

Preferably, each transponder 20 will be located at a fixed location in the venue 18. For example, each transponder 20 may be attached to or embedded into a fixed object at the venue 18, such as a chair, bench, and/or bleacher seat for instance. In this respect, a venue 18 with a large number of seats will preferably have a transponder 20 affixed to or embedded into every seat, such that the transponder 20 in closest proximity to an attendee will be the transponder 20 at the attendee's seat. As another example, the transponders 20 may be attached to or embedded into the structure of the venue 18 itself, such as a floor, ceiling, and/or wall of the venue 18. As yet another example, for outdoor venues 18, the transponders 20 may be attached to or embedded into the ground. Other examples are possible as well. In any of the above example, the number and location of the transponders 20 within the venue 18 may be selected by the vendor and/or the venue 18 to most effectively implement the vending service.

When the transponders 20 are located at fixed locations, each transponder's pre-stored identification data will preferably include data that indicates the transponder's fixed location. For example, each transponder's identification data may include a unique transponder identifier that may be used to look up data indicating the fixed location. As another example, each transponder's identification data may include a unique location identifier, such as a seat identifier (e.g., section/row/seat numbers), a geospatial coordinate identifier (e.g., a Geocode, latitude/longitude, etc.), and/or some other identifier that uniquely describes locations of the venue 18 for instance. Other examples are possible as well.

Figure 4:
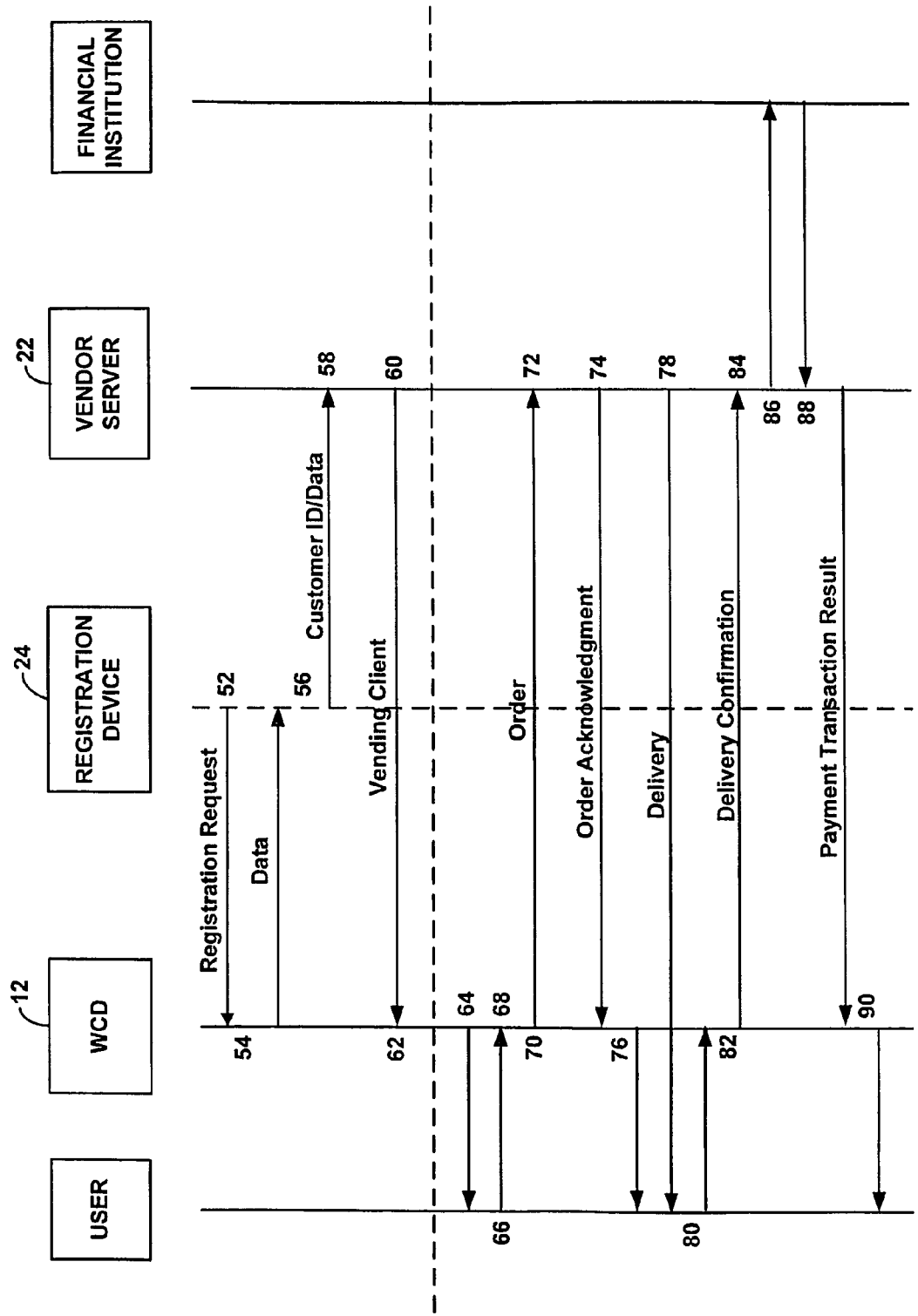
FIG. 4 is a simplified message flow diagram that illustrates an exemplary communication between a given wireless communication device (WCD) and a vending system for providing a user of the given WCD with vending service.

FIG. 4 is a simplified message flow diagram that illustrates an exemplary communication between a given WCD 12 and the vending system 14 for providing a user of the given WCD 12 with vending service. For purposes of illustration, the following description will assume that the given WCD 12 registers for vending service at the venue 18 before providing the user with vending service. It should be understood, however, that the given WCD 12 may not necessarily have to register for vending service before providing the user with vending service, and that the given WCD 12 may also register for the vending service in other manners (e.g., communicating with the vending system 14 via the communication path 16 before arriving at the venue).

The sequence may begin when the given WCD 12 is located within the venue 18 and moves within range of any registration device 24 of the vending system 14. In this respect, a range of a given registration device 24 may depend on the wireless communication protocol employed by the given registration device 24. For example, if the given registration device 24 employs an NFC protocol, the given registration device 24 may have a range of less than 20 cm. In this respect, a user of the WCD 12 may need to place the WCD 12 in close proximity to the transceiver of the registration device 24. As another example, if the given registration device 24 employs a Bluetooth protocol, the given registration device 24 may have a range of 10 meters. Other examples are possible as well.

At step 52, once the given WCD 12 is within the range of the given registration device 24, the given registration device 24 may initiate a registration process between the given WCD 12 and the vending system 14. More particularly, the given registration device 24 may send a registration offer to the given WCD 12 via a wireless link, such as one of the wireless links 26 described above. In one example, the given registration device 24 may initiate the registration process automatically upon detecting the given WCD 12 within the given registration device's range. As another example, the given registration device 24 may initiate the registration process in response to a request by a user of the given WCD 12, which may be communicated to the given registration device 24 via manual user input at the given registration device 24 and/or via a message from the given WCD 12. In either case, the given WCD 12 may then accept the registration offer automatically, or the given WCD 12 may prompt the user to accept the registration offer. Other examples for initiating the registration process may exist as well.

Once the registration process is initiated, the given registration device 24 may generate a customer identifier for the given WCD 12, which the vending system 14 and the given WCD 12 may then use during the ordering process as described in more detail below. The format of the customer identifier may vary depending on the particular vendor, vending system 14, and/or venue 18. As one example, the customer identifier may be an alphanumic identifier, such as "johndoe123456," "StadiumName1," or "AZ9657BR21-5" for instance. Many other examples are possible as well.

At step 54, after accepting the registration request, the given WCD 12 may send data relevant to the vending service, including user data and/or device data, to the registration device 24. In this respect, in one example, the relevant data may be pre-stored on the WCD 12, in which case no further user input will be needed during the registration process. In another example, the user may need to input at least a portion of the relevant data into the WCD 12 during the registration process before the WCD 12 can send the relevant data to the given registration device 24.

As one example, the relevant data sent by the given WCD 12 may include payment data for the user of the given WCD 12, such as payment card data and/or bank account data, which the vending system 14 may use when carrying out a payment transaction for the order. In this respect, the given WCD 12 will preferably send the payment data using a secure form of communication. As another example, the relevant data sent by the given WCD 12 may include preference data for a user of the given WCD 12, such as data indicating the user's preferences for types, brands, quantities, sizes, and/or complementary items of items available for purchase, which the vending system 14 may use when processing the user's order. As yet another example, the relevant data sent by the given WCD 12 may include device data, such as data that indicates the WCD's type, brand, service provider, supported protocol(s), operating system, firmware, processor capability, and/or data storage capacity for instance, which the vending system 14 may use to complete the registration process. The relevant data sent by the given WCD 12 may include other data as well.

At step 56, the registration device 24 may receive the relevant data from the WCD 12 and then responsively send the generated customer identifier and the relevant data for the given WCD 12 to the on-site vendor server 22. In turn, at step 58, the on-site vendor server 22 may receive the customer identifier and the relevant data for the given WCD 12 and then responsively store the customer identifier and the relevant data for future use.

After receiving the customer identifier and the relevant data for the WCD 12, the on-site vendor server 22 may also authorize the given WCD 12 and/or the user thereof for the vending service. For example, the on-site vendor server 22 may verify that the user's payment data is valid. In this respect, the on-site vendor server 22 may validate the payment data by performing a redundancy check, such as a Luhn algorithm, on the payment data. Additionally or alternatively, the on-site vendor server 22 may communicate with one or more financial institutions (either directly or via a payment gateway) to verify that the user's payment data is valid. In another example, the on-site vendor server 22 may verify that the WCD 12 is capable of receiving the vending system's vending service. In this respect, the on-site vendor server 22 may maintain data indicating predefined device requirements for the vending service (e.g., operating system, processor capability, data storage capacity, etc.), and the on-site vendor server 22 may then compare the WCD's device data to maintained data to ensure that the given WCD 12 meets the requirements. Other examples are possible as well.

At step 60, after authorizing the given WCD 12 and/or the user thereof, the on-site vendor server 22 may send the given WCD 12 program logic and data that enables the given WCD 12 to carry out additional functions according to examples of the present invention. (As used herein, program logic preferably comprises program instructions that are executable or interpretable by a processor to cause a computing device to perform various tasks). In this respect, the program logic and data may take the form of an installable software program, which may be referred to as a vending client. Further, the program logic and data may vary depending on the given WCD 12, the vendor, and/or the venue 18. In this respect, the on-site vendor server 22 may use the device data of the given WCD 12 to select the program logic and data to send to the given WCD 12.

In one example, as described in more detail below, the program logic and data sent by the on-site vendor server 22 may enable the WCD 12 to (a) present the user with items available for purchase from the vendor, (b) receive user input for the items available for purchase from the vendor, (c) send and/or modify an order for items available for purchase from the vendor, (d) obtain and send identification data stored at the transponders 20, (e) confirm delivery of an ordered item, and/or (f) receive a status of an order and/or a payment transaction. Further, the program logic and data will preferably include program logic and data for a graphical user interface (GUI) that enables a user of the given WCD 12 to interact with the vending client on the given WCD 12. Further yet, the program data will preferably include at least the WCD's customer identifier and data indicating the items available for purchase from the vendor.

At step 62, the given WCD 12 may receive the vending client from the on-site delivery server 22 via a wired link 32, the network 30, and a wireless link 28. In turn, the given WCD 12 may install the vending client by storing the program logic and data of the vending client for future use. Once installed, the given WCD 12 may then invoke the vending client, either automatically or in response to receiving a directive from a user, to provide the user with vending service.

At step 64, once the registration process is complete and the given WCD 12 has invoked the vending client, the given WCD 12 may present the user with data indicating one or more items available for purchase from the vendor. In an alternate embodiment, however, the given WCD 12 may not present the user with any data indicating the one or more items available for purchase from the vendor, in which case the user may select items to purchase from the vendor based on the user's prior knowledge of the items that are available for purchase from the vendor.

In a preferred example, the given WCD 12 will present the items available for purchase from the vendor via the GUI of the vending client. In this respect, the GUI may present the items available for purchase from the vendor in a variety of forms. For example, the GUI may present all items for purchase on a single display page. As another example, the GUI may separate the items for purchase onto different display pages according to item category (e.g., food on one page, beverages on a second page, etc.). In this respect, the GUI may present the item categories on a first display page, and GUI may then link the display pages containing the items for each category to the first display page. Many other examples are possible as well, and may depend on the particular vendor and/or the venue 18.

While presenting the user with the items available for purchase from the vendor, the given WCD 12 may also present the user with data indicating any available options for the items available for purchase (e.g., via the GUI of the vending client). For example, the given WCD 12 may present the user with options for a type, brand, quantity, size, and/or complementary item of each item available for purchase. In an alternate embodiment, the WCD 12 may not present the user with any options for the selected items, in which case the vending system 14 may rely on the stored user preference data for the given WCD 12 to select the options for any ordered items.

At step 66, the user of the given WCD 12 may select one or more items to purchase from the vending system 14 (along with any available options for the one or more items), input the selections into the given WCD 12, and then direct the given WCD 12 to submit an order for the selected items to the vending system 14. In one example, the user may input selections and direct the given WCD 12 to submit the order by selecting one or more graphic icons displayed on the given WCD 12 (e.g., within the GUI of the vending client). In another example, the user may input selections and direct the given WCD 12 to submit the order by entering one or more text commands via a keyboard of the given WCD 12. In yet another example, the user may input selections and direct the given WCD 12 to submit the order by speaking one or more voice commands into a microphone of the given WCD 12. Other examples are possible as well.

At step 68, the WCD 12 may receive the user's directive to submit the order to the vending system 14. In response, the given WCD 12 may obtain identification data stored at a given transponder 20 in proximity to the given WCD 12, and preferably the transponder 20 in closest proximity to the given WCD 12. As described above, the given transponder's pre-stored identification data will preferably include data that indicates a fixed location of the given transponder 20 (e.g., a transponder identifier that correlates to location data or a location identifier). In this respect, due to the proximity of the given WCD 12 and the given transponder 20, the data indicating the given transponder's fixed location will also indicate a location of the given WCD 12 and the user thereof. As one example, for venues with a large number of seats (e.g., stadiums), the indicated location may be a seat of the user.

In one example, the given WCD 12 may obtain the given transponder's pre-stored identification data by (a) transmitting a control signal to the given transponder 20 and (b) receiving and reading data that is responsively transmitted back from the given transponder 20, which will preferably include the pre-stored identification data. In a preferred example, the given WCD 12 will carry out the function of obtaining the identification data from the transponder 20 automatically, such that no additional user interaction is required to obtain the identification data and thus indicate the user's location.

At step 70, after obtaining the identification data, the WCD 12 may submit the order for the selected items to the vending system 14, and more particularly the on-site vendor server 22, via the wireless link 28, the network 30, and the wired link 32. In this respect, the submitted order may include at least the WCD's customer identifier, an identifier of each ordered item, and the obtained identification data. Additionally, the submitted order may include indications of any selected options for the ordered items, such as indications of the type, brand, quantity, size, and/or complementary item of the ordered items. Additionally yet, the submitted order may include payment data for the user, such as payment card data or bank account data. The submitted order may include other information as well.

At step 72, the vending system 14, and more particularly the on-site vendor server 22, may receive the order from the given WCD 12 via the network 16. In response, the on-site vendor server 22 may process the order. For example, after receiving the order, the on-site vendor server 22 may use the identification data included in the order to determine a location of the given WCD 12. For example, the on-site vendor server 22 may extract a transponder identifier from the data obtained from the transponder 20 and then use the transponder identifier to look up data indicating a fixed location of the transponder 20, and thus a current location of the given WCD 12. In this respect, the on-site vendor server 22 may maintain data that correlates a transponder identifier of each transponder 20 with location data for the transponder 20. As another example, the on-site vendor server 22 may extract a location identifier from the data obtained from the transponder 20 and then use the location identifier to determine a fixed location of the transponder 20, and thus a current location of the given WCD 12. In this respect, the location identifier itself will preferably represent the fixed location of the transponder 20 (e.g., the location identifier is a section/row/seat number), in which case no lookup would be required to determine the fixed location of the transponder 20. Other examples are possible as well.

As another example, the on-site vendor server 22 may use the customer identifier of the given WCD 12 to access the user preference data for the given WCD 12, which the on-site server 22 may be maintaining as a result of the registration process. In turn, the on-site vendor server 22 may use the accessed user preference data to update the order. For example, if the order includes an identifier of a selected item (e.g., a beer) but does not indicate any selected options for the item, the vending system 14 may use the preference data to update the order with options for the item (e.g., brand or size of the beer). As another example, if the order includes an identifier of a selected category of items (e.g., food) but not an identifier of a selected item within the category, the vending system 14 may use the preference data to update the order with a selected item within the selected category (e.g., a hot dog or nachos). Other examples are possible as well.

As yet another example, after receiving the order, the on-site vendor server 22 may determine an availability of the ordered items. In this respect, the vending system 14 may maintain data that indicates a quantity of each item available for purchase from the vendor, and the vending system 14 may use the identifiers of the items included in the order to look up a quantity of each ordered item. If the items are available for purchase, the vending client 14 may proceed to fulfilling the order. Alternatively, if one or more of the items are not available for purchase (e.g., the indicated quantity is 0), the vending system 14 may send the WCD 12 a message indicating that the one or more items are currently unavailable, and/or the vending system 14 may replace the unavailable one or more items in the order with similar items.

At step 74, while processing the order, the on-site vendor server 22 may send an acknowledgment of the order to the given WCD 12 via the wired link 32, the network 30, and the wireless link 28. In this respect, the acknowledgment may indicate details of the order. For example, the acknowledgement may indicate a determined location of the given WCD 12. As another example, the acknowledgement may indicate an availability of each ordered item. As yet another example, the acknowledgement may indicate an estimated delivery time of each ordered item. As still another example, the acknowledgement may indicate a price of each ordered item and a total price of the user's order. As a further example, the acknowledgement may indicate any updates to the order, such as updates based on the preference data for the given WCD 12. Other examples are possible as well.

At step 76, the given WCD 12 may receive the acknowledgement from the on-site vendor server 22 via the wired link 32, the network 30, and the wireless link 28. In response, the given WCD 12 may then present the acknowledgement to the user, such as by displaying the acknowledgement within the GUI of the vending client. In turn, the given WCD 12 may receive additional user input relating to the order, such as requested modifications and/or clarifications to the order. In this respect, the given WCD 12 may send the additional user input to the on-site vendor server 22, which may then update the order based on the requested modifications and/or clarifications.

At step 78, the vending system 14 may facilitate delivery of the ordered items to the determined location of the given WCD 12. For example, the on-site vendor server 22 may notify a roaming vendor of the given WCD's ordered items and the determined location, such as by sending a message to a WCD 12 operated by the roaming vendor. In turn, the roaming vendor may gather the ordered items and then deliver the ordered items to the user at the determined location of the given WCD 12 (e.g., the user's seat at the venue 18).

At step 80, the user may receive delivery of the ordered items at the determined location of the given WCD 12. In turn, the user may direct the given WCD 12 to confirm delivery of the ordered items. For example, the user may direct the given WCD 12 to confirm the delivery by selecting a graphic icon displayed on the given WCD 12 (e.g., within the GUI of the vending client). As another example, the user may direct the given WCD 12 to confirm the delivery by entering a text command via a keyboard of the given WCD 12. As yet another example, the user may direct the given WCD 12 to confirm the delivery by speaking a voice command into a microphone of the given WCD 12. Other examples are possible as well. At step 82, the given WCD 12 may then receive the user's directive and responsively send a delivery confirmation to the on-site vendor server 22 via the wireless link 28, the network 30, and the wired link 32, which the on-site vendor server 22 may receive at step 84.

At step 86, the on-site vendor server 22 may initiate a payment transaction for the order. Preferably, the on-site vendor server 22 will initiate the payment transaction in response to receiving the delivery confirmation from the given WCD 12. Alternatively, the on-site vendor server 22 may initiate the payment transaction in response to some other triggering event. In one example, the on-site vendor server 22 may initiate the payment transaction by first accessing the payment data for the given WCD 12, which may be maintained by the on-site vendor server 22 as a result of the registration process (and accessed using the WCD's customer identifier) and/or included in the order. The on-site vendor server 22 may then send the payment data to one or more financial institutions (either directly or via a payment gateway) to obtain authorization of the user's payment for the order.

At step 88, the on-site vendor server 22 may receive a response from the one or more financial institutions indicating a result of the payment transaction (e.g., payment approved or payment denied). In turn, the on-site vendor server 22 may send the payment transaction result to given WCD 12 via the wired link 32, the network 30, and the wireless link 28, which the given WCD 12 may receive and present to the user at step 90 (e.g., by displaying the result within the GUI of the vending client). Additionally, the on-site vendor server 22 may notify the roaming vendor of the payment transaction result, such as by sending the payment transaction result to a WCD 12 operated by the roaming vendor. If the payment transaction result is an approval of the user's payment data, the vendor may deem the transaction completed and the user of the given WCD 12 may enjoy the ordered items. Alternatively, if the result of the payment transaction is a denial of the user's payment data, the vendor may require an alternate payment method and/or a return of the ordered items.

Figure 5:
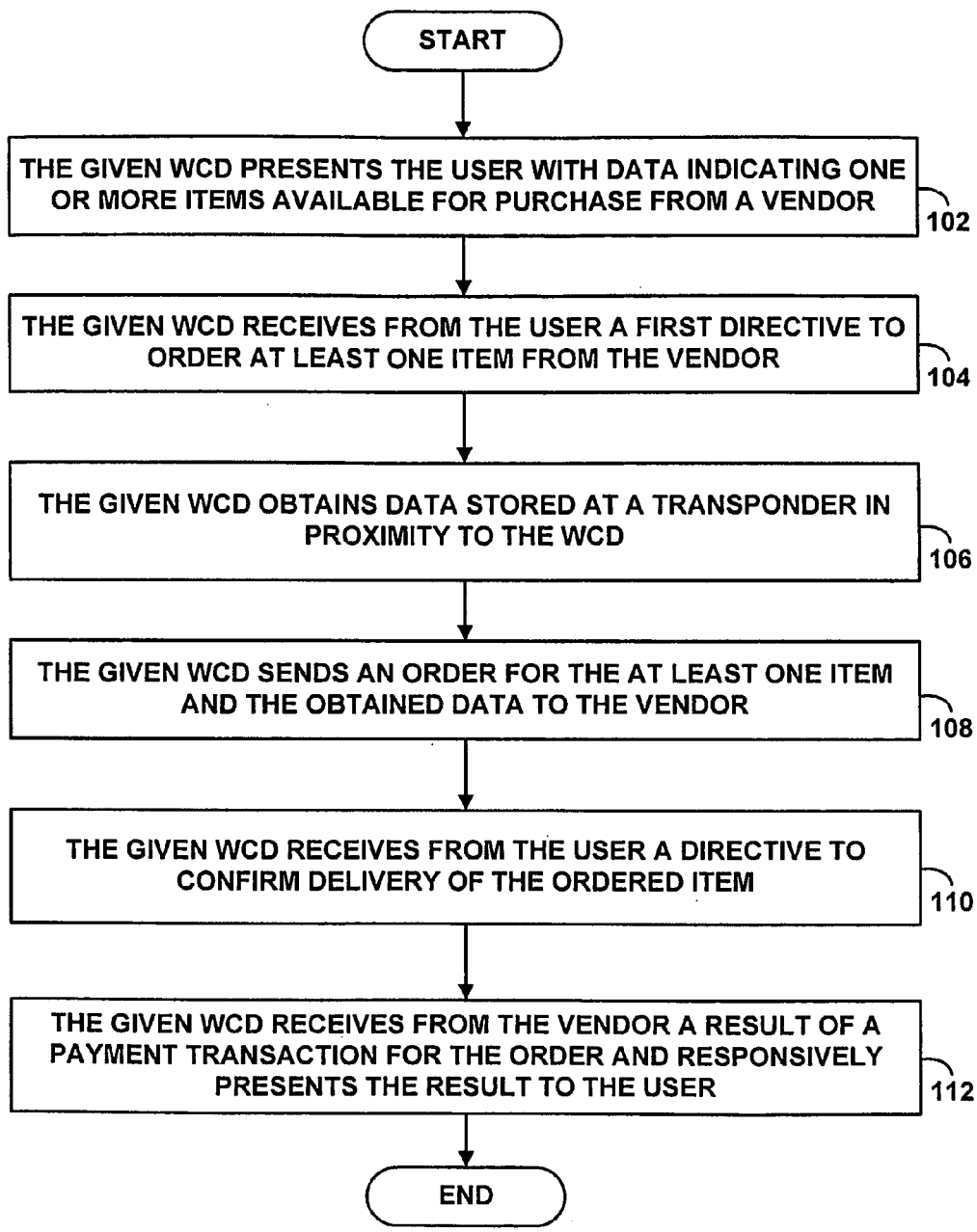
FIG. 5 is a flow chart depicting a method of providing a user of a given WCD with vending service, according to an example of the present invention.

FIG. 5 is a flow chart depicting a method of providing a user of a given WCD 12 with vending service, according to an example of the present invention. In a preferred example, the method described herein will be carried out by the given WCD 12, which may work together with the vending system 14 to provide the user with the vending service.

Before providing the user with vending the service, the given WCD 12 may first register for vending service. (It should be understood, however, that the given WCD 12 may not necessarily have to register for vending service before providing the user with vending service.) In one example, the given WCD 12 may receive an offer to register for the vending service from the vendor. In response, the given WCD 12 may accept the registration offer and then send data relevant to the vending service to the vendor, which the vendor may store for future use. For example, the given WCD 12 may send the vendor user data (e.g., user preference data or user payment data) and/or device data. After sending the data to the vendor, the WCD 12 may then receive from the vendor program logic and data that enables the given WCD 12 to interact with the vendor to provide the user with vending service. In this respect, the program data may include at least a customer identifier of the given WCD 12, which the vendor generates during the registration process, and data indicating one or more items available for purchase from the vendor. Other examples of registering for vendor service may exist as well.

At step 102, the given WCD 12 may present the user with data indicating one or more items available for purchase from the vendor. In addition, the given WCD 12 may present the user with data indicating any available options associated with the items available for purchase. For example, the given WCD 12 may present the user with options for a type, brand, quantity, size, and/or complementary item of each item available for purchase from the vendor. Other examples are possible as well. Further, in an alternate embodiment, the given WCD 12 may not present the user with any data indicating the one or more items available for purchase from the vendor, in which case the user may select items to purchase (and associated options) from the vendor based on the user's prior knowledge of the items (and options) that are available for purchase from the vendor.

At step 104, the given WCD 12 may receive from the user a directive to order at least one item from the vendor. Along with the directive to order the at least one item, the given WCD 12 may also receive user input for one or more options associated with the at least one item. For example, the given WCD 12 may receive user input for a type, brand, quantity, size, and/or complementary item of the at least one item. Other examples are possible as well.

At step 106, in response to receiving the directive, the given WCD 12 may obtain data stored at a given transponder 20 in proximity to the given WCD 12, and preferably the transponder 20 in closest proximity to the given WCD 12. As described above, the given transponder's pre-stored data will preferably include data that indicates a fixed location of the given transponder 20. In this respect, due to the proximity of the given WCD 12 and the given transponder 20, the data indicating the given transponder's fixed location will also indicate a location of the given WCD 12 and the user thereof. As one example, for venues with a large number of seats (e.g., stadiums), the indicated location may be a seat of the user.

In one example, the given WCD 12 may obtain the given transponder's pre-stored data by (a) transmitting a control signal to the given transponder 20 and (b) receiving and reading data that is responsively transmitted back from the given transponder 20, which will preferably include the pre-stored data. In a preferred example, the given WCD 12 will carry out the function of obtaining the data from the transponder 20 automatically, such that no additional user interaction is required.

At step 108, after obtaining the data, the given WCD 12 may send to the vendor (a) the order for the at least one item and (b) the obtained data. In this respect, the given WCD 12 may send the order and the data to the vending system 14, and more particularly the on-site vendor server 22, via the wireless link 28, the network 30, and the wired link 32. In response to receiving the order for the at least one item and the data, the vendor may use the data to determine a location of the given WCD 12. In addition, the vendor may optionally use a customer identifier of the given WCD 12 included in the order to access the previously stored user preference data for the given WCD 12, which the vendor may use to update the order. After determining the location of the given WCD 12 and optionally updating the order, the vendor may then deliver the ordered item to the user at the determined location (e.g., the user's seat at the venue 18).

At step 110, after delivery of the ordered item to the determined location, the given WCD 12 may receive from the user a directive to confirm delivery of the ordered item. In turn, the given WCD 12 may send to the vendor a confirmation of delivery of the ordered item. Upon receiving the confirmation, the vendor may initiate a payment transaction for the order using the payment data of the user, which may be maintained by the on-site vendor server 22 as a result of the registration process (and accessed using the WCD's customer identifier) and/or included in the order. At step 112, the given WCD 12 may then receive from the vendor a result of the payment transaction for the order (e.g., payment approved or payment denied) and responsively present the result to the user.

Figure 6:
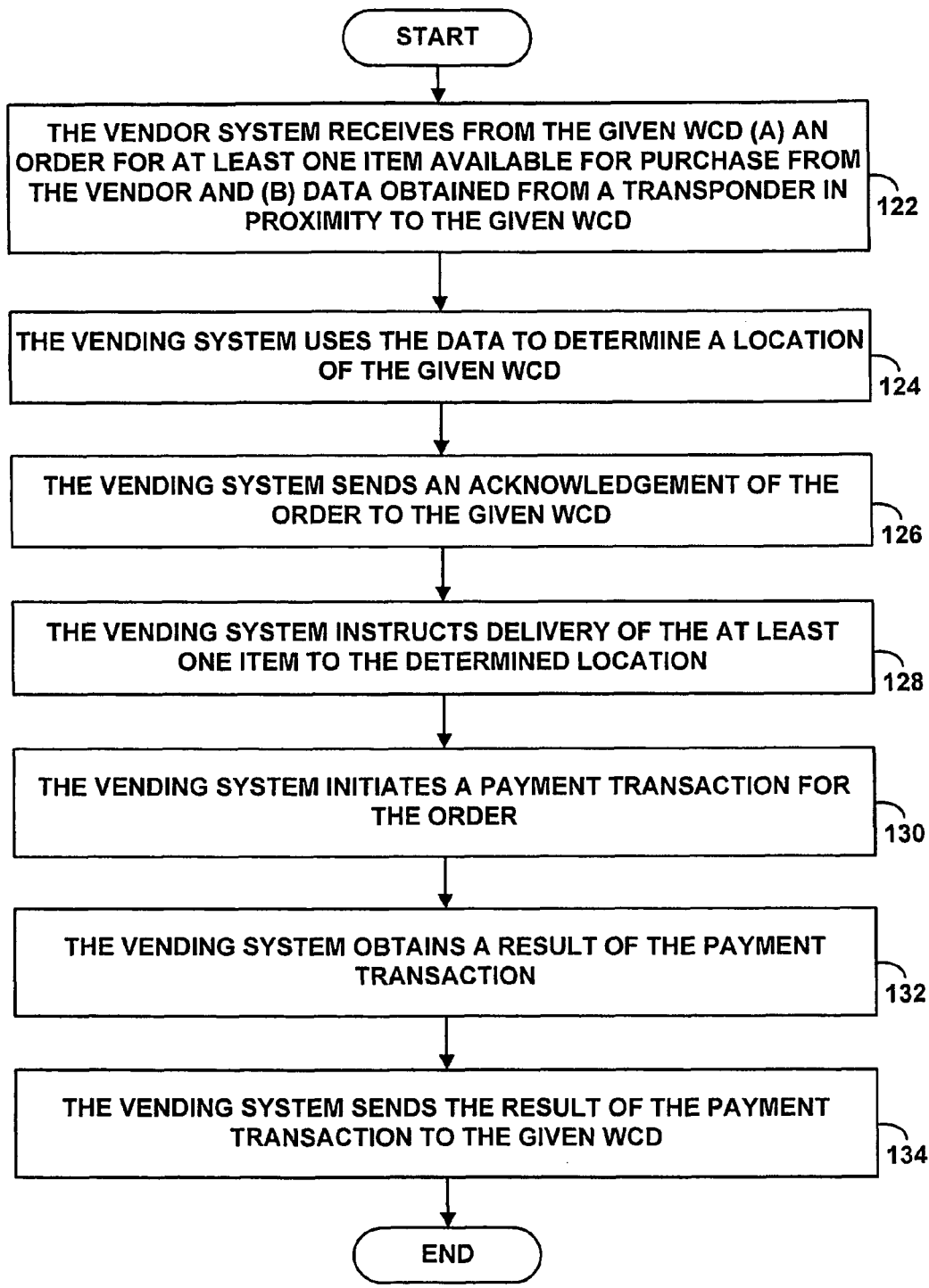
FIG. 6 is a flow chart depicting a method of providing a user of a given WCD with vending service, according to another example of the present invention.

FIG. 6 is a flow chart depicting a method of providing a user of a given WCD 12 with vending service, according to another example of the present invention. In a preferred example, the method described herein will be carried out by the vendor, and more particularly the vending system 14, which may work together with the given WCD 12 to provide the user with vending service.

Before providing the user with vending the service, the vending system 14 may first register the given WCD 12 for vending service. (It should be understood, however, that the vending system 14 may not necessarily have to register given WCD 12 for vending service before providing the user with vending service). In one example, the vending system 14 may send the given WCD 12 an offer to register for the vending service from the vendor. If the given WCD 12 accepts the offer to register, the vending system 14 may then receive from the given WCD 12 data relevant to the vending service, such as user data (e.g., user preference data or user payment data) and/or device data. In turn, the vending system 14 may store the data from the given WCD 12 for future use. Additionally, the vending system 14 may generate a customer identifier for the given WCD 12, which the vending system 14 may store along with the data received from the given WCD 12.

After receiving the data from the given WCD 12, the vending system 14 may authorize the given WCD 12 and/or the user thereof for the vending delivery service. Thereafter, the vending system 14 may send the given WCD 12 program logic and data that enables the given WCD 12 to interact with the vending system 14 to provide the user with vending service. In this respect, the program data may include at least the generated customer identifier of the given WCD 12 and data indicating items available for purchase from the vendor. Other examples for registering the given WCD 12 for vending service may be used as well.

At step 122, the vending system 14 may receive from the given WCD 12 (a) an order for at least one item available for purchase from the vendor and (b) data obtained from a transponder 20 in proximity to the given WCD 12. The received order may include at least the customer identifier of the given WCD 12 and an identifier of the at least one item. Additionally, the received order may include indications of any selected options for the at least one item, such as an indication of a type, brand, quantity, size, and/or complementary item of the at least one item. Additionally yet, the received order may include payment data for the user, such as payment card data or bank account data. The order may include other information as well. The data obtained from the transponder 20 will preferably include data that indicates a fixed location of the transponder 20. In this respect, due to the proximity of the given WCD 12 and the transponder 20, the data indicating the given transponder's fixed location will also indicate a location of the given WCD 12 and the user thereof. As one example, for venues with a large number of seats (e.g., stadiums), the indicated location may be a seat of the user.

At step 124, after receiving the order and the data obtained from a transponder 20, the vending system 14 use the data obtained from the transponder 20 to determine a location of the given WCD 12. For example, the vending system 14 may extract a transponder identifier from the data obtained from the transponder 20 and then use the transponder identifier to look up data indicating a fixed location of the transponder 20, and thus a current location of the given WCD 12 (e.g., the user's seat). In this respect, the vending system 14 may maintain data that correlates a transponder identifier of each transponder 20 with location data for the transponder 20. As another example, the vending system 14 may extract a location identifier from the data obtained from the transponder 20 and then use the location identifier to determine a fixed location of the transponder 20, and thus a current location of the given WCD 12 (e.g., the user's seat). Other examples are possible as well.

Additionally, after receiving the order, the vending system 14 may use the customer identifier of the given WCD 12 to access the user preference data for the given WCD 12, which the vending system 14 may be maintaining as the result of the registration process. In turn, the vending system 14 may use the accessed user preference data for the given WCD 12 to update the order. For example, if the order includes an identifier of a selected item (e.g., a beer) but does not indicate any selected options for the item, the vending system 14 may use the preference data to update the order with options for the item (e.g., brand or size of the beer). As another example, if the order includes an identifier of a selected category of items (e.g., food) but not an identifier of a selected item within the category, the vending system 14 may use the preference data to update the order with a selected item within the selected category (e.g., a hot dog or nachos). Other examples are possible as well.

Additionally yet, after receiving the order, the vending system 14 may determine an availability of the at least one item. In this respect, the vending system 14 may maintain data that indicates a quantity of each item available for purchase from the vendor, and the vending system 14 may use the identifier of the at least one item, which is included in the order, to look up a quantity of the at least one item. If the at least one item is available for purchase, the vending client 14 may proceed to fulfilling the order. Alternatively, if the at least one item is not available for purchase (e.g., the indicated quantity is 0), the vending system 14 may send the WCD 12 a message indicating that the at least one item is currently unavailable, and/or the vending system 14 may replace the unavailable item in the order with a similar item.

At step 126, the vending system 14 may send an acknowledgment of the order to the given WCD 12. In this respect, the acknowledgment may indicate details of the order. For example, the acknowledgement may indicate a determined location of the given WCD 12. As another example, the acknowledgement may indicate an availability of the at least one item. As yet another example, the acknowledgement may indicate an estimated delivery time of the at least one item. As still another example, the acknowledgement may indicate a price of the at least one item. As a further example, the acknowledgement may indicate any updates to the order, such as updates based on the preference data for the given WCD 12. Other examples are possible as well.

At step 128, the vending system 14 may instruct delivery of the at least one items to the determined location of the given WCD 12. For example, the vending system 14 may notify a roaming vendor of the given WCD's at least one item and determined location, such as by sending a message to a WCD 12 operated by the roaming vendor. In turn, the roaming vendor may obtain the at least one item and then deliver the at least one item to the user at the determined location of the given WCD 12.

At step 130, the vending system 14 may then initiate a payment transaction for the order. Preferably, the vending system 14 will initiate the payment transaction in response to receiving a delivery confirmation from the given WCD 12. Alternatively, the vending system 14 may initiate the payment transaction in response to some other triggering event. In one example, the vending system 14 may initiate the payment transaction by first accessing the payment data for the given WCD 12, which may be maintained by the vending system 14 as a result of the registration process (and accessed using the WCD's customer identifier) and/or included in the order. The vending system 14 may then send the payment data for the given WCD 12 to one or more financial institutions (either directly or via a payment gateway) to obtain authorization of the user's payment for the order.

At step 132, the vending system 14 may obtain a result of the payment transaction. For example, in response to sending the payment data for the given WCD 12 to one or more financial institutions, the vending system 14 may receive a response from the one or more financial institutions indicating the result of the payment transaction (e.g., payment approved or payment denied). In turn, at step 134, the vending system 14 may send the payment transaction result to given WCD 12 via the wired link 32, the network 30, and the wireless link 28. Thereafter, if the payment transaction result is an approval of the user's payment data, the vendor may deem the transaction completed. Alternatively, if the result of the payment transaction is a denial of the user's payment data, the vendor may require an alternate payment method and/or return of the at least one item.

Advantageously, the present invention may provide the user of the given WCD 12 with an improved vending service at the venue 18. For example, the present invention may enable the user to order items from the vendor and receive delivery of those items at his current location (e.g., his seat) via the given WCD 12, as opposed to requiring the user to leave his current location, wait in a line, and/or temporarily turn his focus away from the event to purchase the items. In this respect, the present invention may enable the given WCD 12 and the vendor to accurately determine the user's location in the venue 18 automatically and seamlessly, without requiring any user interaction. As another example, the present invention may enable the user to avoid an awkward payment transaction with a roaming vendor. Other advantages may exist as well.

Figure 7:
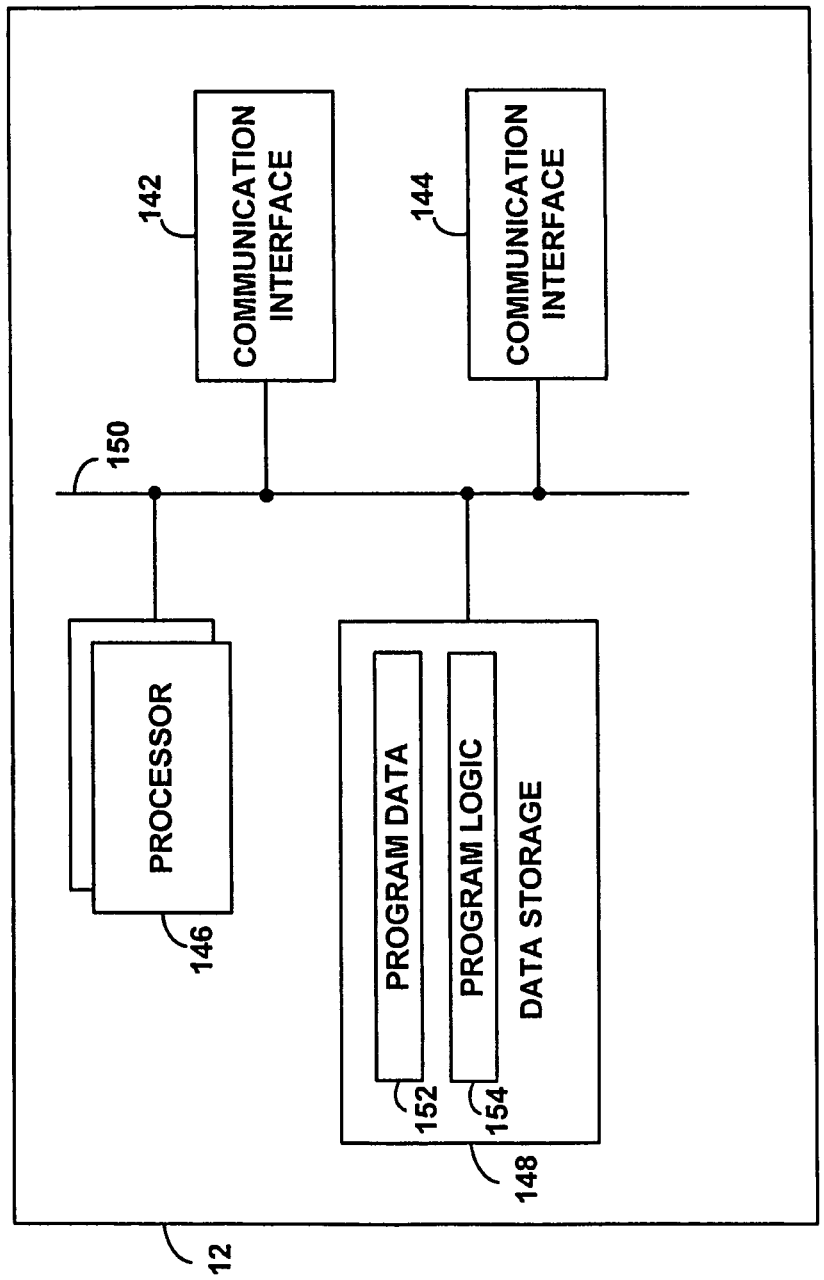
FIG. 7 is a simplified block diagram of a given WCD of FIG. 1, showing functional components that can operate to carry out aspects of the present invention.

FIG. 7 is a simplified block diagram of a given WCD 12 of the system 10, showing functional components that can operate to carry out aspects of the present invention. As shown in FIG. 6, the WCD 12 includes, without limitation, a user interface 142, a communication interface 144, a processor 146, and data storage 148, all interconnected by a system bus or other connection mechanism 150.

The user interface 142 preferably functions to facilitate user interaction with the given WCD 12. The user interface 142 may include a variety of input components, such as a touch screen, a navigation pad, a multi-functional button, a thumb wheel, a keyboard or keypad, and/or a microphone for instance. Additionally, the user interface 142 may include a variety of output components, such as a display screen and/or a speaker for instance. Additionally yet, the user interface 142 may include signal processing components, such as A-D and D-A circuitry. The user interface 142 may include other components for facilitating user interaction with the given WCD 12 as well.

The communication interface 144 preferably functions to communicatively couple the WCD 12 to entities, devices, and/or networks of the system 10. As such, the communication interface 144 may take the form of an Ethernet network interface module, a chipset and antenna adapted to facilitate wireless communication according a desired protocol, and/or any other form that provides for wireless and/or wired communication. The communication interface 146 may also include multiple communication interfaces, such as one communication interface for each entity, device, or network with which the given WCD 12 communicates. In a preferred example, the communication interface 144 will include at least three communication interfaces: (1) a first communication interface for communicating with the on-site vendor server 22 according to a cellular protocol, (2) a second communication interface for communicating with the registration devices 24 according to a short-rage wireless protocol, and (3) a third communication interface for communicating with the transponders 20 according to an AIDC protocol such as RFID. Other configurations are also possible.

The processor 146 may comprise one or more general purpose microprocessors and/or dedicated signal processors. (The term "processor" encompasses either a single processor or multiple processors that could work in combination.) Data storage 148, in turn, may comprise memory and/or other storage components, such as optical, magnetic, organic or other memory or disk/disc storage, which can be volatile and/or non-volatile, internal and/or external, and integrated in whole or in part with the processor 146. Data storage 148 preferably contains or is arranged to contain (i) program data 152 and (ii) program data 154. Although these components are described herein as separate data storage elements, the elements could just as well be physically integrated together or distributed in various other ways. In a preferred example, the program data 152 would be maintained in data storage separate from the program logic 154, for easy updating and reference by the program logic 154.

Program data 152 may contain data for a user of the given WCD 12. For example, program data 152 may contain identification data for the user of the given WCD 12, such as data indicating the user's name, address, email address, and/or social security number for instance. As another example, program data 152 may contain payment data for the user of the given WCD 12, such as payment card data (e.g., Primary Account Number (PAN), cardholder name, expiration date, magnetic stripe data, verification data, etc.) and/or bank account data (e.g., account number, routing number, bank name, etc.). As yet another example, program data 152 may contain preference data for the user of the given WCD 12, such as data indicating the user's preferences for types, brands, quantities, sizes, and/or complementary items of items available for purchase from the vendor. Program data 152 may contain other data for the user of the given WCD 12 as well.

Program data 152 may also contain data for the given WCD 12 itself. For example, program data 152 may contain data indicating a type, brand, service provider, supported protocol(s), firmware, storage capacity, and/or device identifier of the given WCD 12. Program data may contain other data for the given WCD 12 as well.

Program data 152 may further contain data that the WCD 12 receives from the vending system 14 during the registration process. For example, program data 152 may contain a customer identifier of the given WCD 12 for vending service, which the vending system 14 may generate during the registration process. As another example, program data 152 may contain data indicating one or more items available for purchase from the vendor. As yet another example, program data 152 may contain data indicating one or more available options for each item available for purchase. Program data 152 may contain other data that the WCD 12 receives from the vending system 14 during the registration process as well.

Program data 152 may additionally contain data that the given WCD 12 receives from the user and/or the vending system 14 while providing the user with vending service. For example, program data 152 may contain data indicating a user's selection of items (and associated options) to order from the vendor. As another example, program data 152 may contain data indicating a status of an order and/or a payment transaction. Program data 152 may contain other data that the given WCD 12 receives from the user and/or the vending system 14 while providing the user with vending service as well.

Program logic 154 preferably comprises machine language instructions that may be executed or interpreted by processor to carry out functions according to examples of the present invention. It should be understood, however, that the program logic 154 and its associated functions are described herein by way of example only. As such, those skilled in the art will appreciate that other program logic 154 and/or functions may be used instead, some program logic 154 and/or functions may be added, and some program logic 154 and/or functions may be omitted altogether. Further, the various functions described herein can be embodied in software, hardware, and/or firmware.

In one example, at least a portion of the program logic 154 described herein may be installed on the given WCD 12 prior to the given WCD 12 registering with the vending system 14. In another example, the given WCD 12 may receive at least a portion of the program logic 154 described herein from the vending system 14 during the registration process.

The program logic 154 may be executable by the processor 146 to registration the given WCD 12 for vending service. For example, the program logic 154 may be executable by the processor to cause the given WCD 12 to (a) receive a registration offer from the vending system 14, (b) accept the registration offer, (c) send to the vending system 14 data relevant to the vending service, and (d) receive additional program logic and data that enables the given WCD 12 to carry out additional functions according to examples of the present invention.

The program logic 154 may also be executable by the processor 146 to provide the user with vending service. For example, the program logic 154 may be executable by the processor to cause the given WCD 12 to (a) present the user with items available for purchase from the vendor (e.g., via a GUI), (b) receive user input for the items available for purchase from the vendor (e.g., via a GUI), (c) send and/or modify an order for items available for purchase from the vendor, (d) obtain and send identification data stored at the transponders 20, (e) confirm delivery of an ordered item, and/or (f) receive a status of an order and/or a payment transaction. The program logic 154 may be executable by the processor 146 to carry out other functions as well.

Exemplary embodiments of the present invention have been described above. Those skilled in the art will understand, however, that changes and modifications may be made to the embodiments described without departing from the true scope and spirit of the present invention, which is defined by the claims.

We claim:

1. A method for providing a user of a wireless communication device (WCD) with vending service comprising:
    a vending system engaging in a registration process with a WCD for vending service, wherein the registration process includes the vending system receiving from the WCD user preference data specifying at least one selectable option of a first item available for purchase from the vendor, wherein the at least one selectable option comprises at least one of a type, a brand, a quantity, a size, and a complimentary item;
    after engaging in the registration process, the vending system receiving from the WCD (a) an order for the first item and (b) data obtained from a transponder in proximity to the WCD, wherein the data indicates a location of the WCD;
    the vending system using the data obtained from the transponder to determine a location of the WCD;
    the vending system using the user preference data to select the at least one selectable option of the first item and to thereby update the received order to be for the first item with the at least one selectable option; and
    the vending system fulfilling the updated order by facilitating delivery of the first item with the at least one selectable option to the determined location.

2. The method of claim 1, wherein the order for the first item further comprises an order for a second item, the method further comprising:
    after receiving the order, determining that the second item is not available for delivery, and
    in response to determining that the second item is not available for delivery, sending the WCD a notification that the second item is not available for delivery.

3. The method of claim 1, wherein the data obtained from the transponder in proximity to the WCD comprises a transponder identifier, and wherein using the data to determine a location of the WCD comprises using the transponder identifier to look up data indicating a fixed location of the transponder.

4. The method of claim 1, wherein the registration process further includes:
    the vending system sending the WCD program logic and program data to enable the WCD to provide the user with the vending service.

5. The method of claim 1, wherein the registration process further includes:
    the vending system generating an identifier for the WCD;
    the vending system receiving from the WCD user payment data; and
    the vending system storing the identifier for the WCD, the user payment data, and the user preference data.

6. The method of claim 5, further comprising:
    the vending system using the user payment data to initiate a payment transaction for the order.

7. The method of claim 6, wherein the vending system using the payment data to initiate a payment transaction for the order comprises the vending system sending the user payment data to a financial institution, the method further comprising:
    the vending system receiving from the financial institution a response indicating a result of the payment transaction.

8. The method of claim 1, wherein the vending system instructing delivery of the first item to the determined location comprises:
    the vending system sending to a second WCD an instruction to deliver the first item to the determined location, whereby a user of the second WCD delivers the first item to the determined location.

9. The method of claim 1, wherein the registration process further includes:
    the vending system receiving from the WCD device data for the WCD;
    the vending system using the device data to select program logic and program data to enable the WCD to provide the user with the vending service; and
    the vending system sending the selected program logic and program data to the WCD.

10. The method of claim 1, further comprising:
    sending to the WCD an acknowledgment of the order, wherein the acknowledgment comprises (a) a description of the order updated based on the user preference data to be for the first item with the at least one selectable option, and (b) an indication of a determined location of the WCD.

11. A method for providing a user of a wireless communication device (WCD) with vending service comprising:
    a WCD engaging in a registration process with a vendor for vending service, wherein the registration process includes the WCD sending to the vendor user preference data specifying at least one selectable option of a first item available for purchase from the vendor, wherein the at least one selectable option comprises at least one of a brand, a type, a quantity, a size, and a complimentary item;
    after engaging in the registration process, the WCD receiving from a user a first directive to submit an order for the first item;
    in response to receiving the directive, the WCD (a) obtaining data stored at a transponder in proximity to the WCD, wherein the data indicates a location of the WCD, and (b) sending to the vendor the obtained data and the order for the first item, wherein the order does not specify the at least one selectable option of the first item; and
    after sending the obtained data and the order, receiving from the vendor an acknowledgment of the sent order, wherein the acknowledgment comprises (a) a description of the sent order updated based on the user preference data to be for the first item with the at least one selectable option, and (b) an indication of a determined location of the WCD.

12. The method of claim 11, wherein sending the user preference data to the vendor comprises sending the user preference data to a registration device of the vendor via a short-range wireless link, and wherein sending the obtained data and the order to the vendor comprises sending the obtained data and the order to a server of the vendor via a cellular wireless link and a packet-switched network.

13. The method of claim 11, wherein the order includes an identifier of the WCD and an identifier of the first item.

14. The method of claim 11, wherein the order specifies a second selectable option of the first item.

15. The method of claim 11, further comprising:
    before receiving the first directive, presenting the user with data indicating a plurality of items available for purchase from the vendor.

16. The method of claim 11, wherein the registration process further includes the WCD sending user payment data to the vendor, the method further comprising:

receiving from the vendor a message indicating a result of a payment transaction for the order, wherein the payment transaction involves the user payment data.

17. The method of claim 11, wherein the registration process further includes:

before sending the user preference data to the vendor, the WCD receiving from the vendor an offer to register for the vending service; and the WCD receiving from the vendor program logic and program data that enables the WCD to provide the user with the vending service.

18. The method of claim 17, wherein the program data comprises an identifier of the WCD and data indicating a plurality of items available for purchase from the vendor.

19. The method of claim 11, further comprising:

the WCD presenting the description of the updated order to the user as confirmation that the order has been updated based on the user preference data.

20. The method of claim 19, further comprising:

after presenting the description of the updated order, the WCD receiving user input relating to the updated order; and the WCD sending the user input to the vendor.

21. The method of claim 11, further comprising:

the WCD receiving from the user a second directive to send a confirmation of delivery of the item;

in response to receiving the second directive, the WCD sending to the vendor the confirmation of delivery of the item.

22. The method of claim 11, wherein the transponder comprises a radio-frequency identification (RFID) tag.

23. The method of claim 11, wherein the transponder comprises a transponder at a fixed location, and wherein the data stored at the transponder includes data indicating the fixed location.

24. The method of claim 11, wherein the transponder comprises a transponder affixed to a fixed object at a venue.

25. The method of claim 11, wherein the transponder in proximity to the WCD comprises a closest transponder of a plurality of transponders in proximity to the WCD.

26. The method of claim 11, wherein obtaining the data stored at a transponder in proximity to the WCD comprises:

transmitting a control signal to the transponder; and receiving and reading data that is responsively transmitted back from the transponder.

\* \* \* \* \*